May 24, 1966 F. H. STORCK 3,253,171
LAMINATED STRUCTURE BINDING MEANS
Filed Nov. 30, 1961
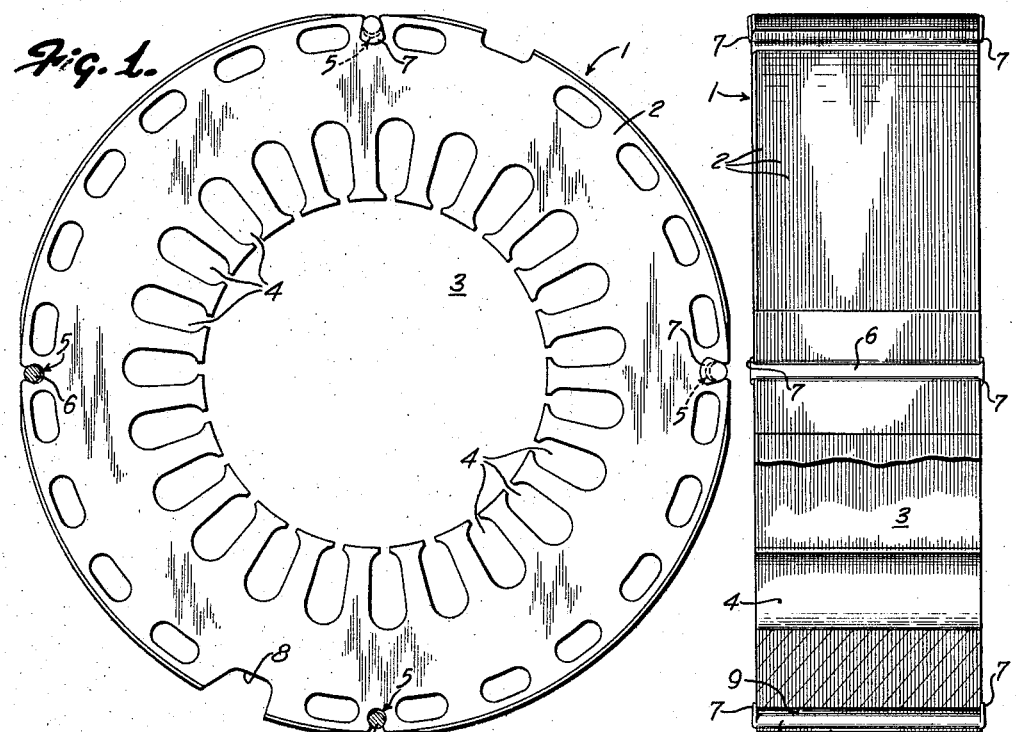
Fig. 1.
Fig. 2.
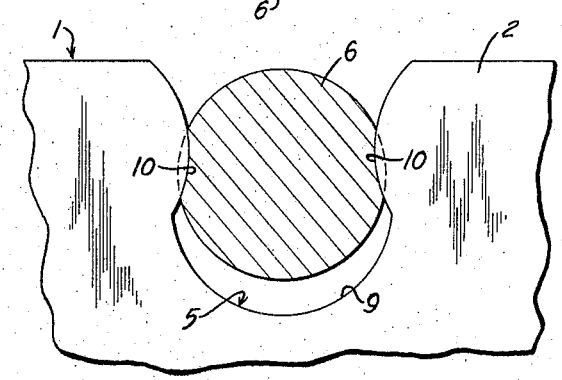
Fig. 3.
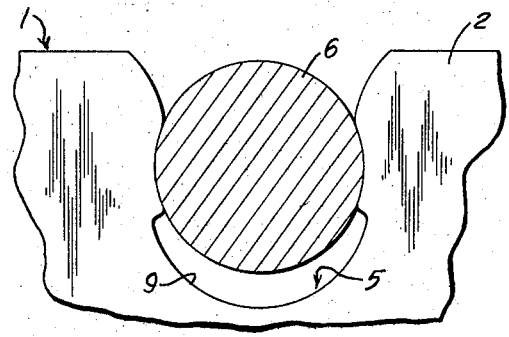
Fig. 4.
INVENTOR.
Frederick H. Storck
BY Andrus & Starke
Attorneys 3,253,171
LAMINATED STRUCTURE BINDING MEANS
Frederick H. Storck, Dayton, Ohio, assignor to A. O. Smith Corporation, Milwaukee, Wis., a corporation of New York
Filed Nov. 30, 1961, Ser. No. 155,954
1 Claim. (Cl. 310—217)

This invention relates to a laminated structure including a stack of individual sheet-like laminations superposed in face-to-face relation and secured together by means of a wedged key-like rod and particularly to a dynamoelectric machine annular stator and the like.

Annular stator cores of dynamoelectric machines and other electrical equipment are generally formed of superposed annular sheet-like laminations having minute surface insulating films. The laminations are secured together by means of axial rivets, longitudinal peripheral welds or the like. Such common constructions however each have certain disadvantages because of relatively heavy eddy current losses, distortion of the laminations and the adverse effect on the property of the insulating films.

The stack of laminations may be secured together with a groove extending along one of the edges of the respective laminations and a key member forced into the groove to frictionally secure the laminations to each other. This securement means generally avoids the various disadvantages of the other means. However, the provision of a key and groove securement of sufficient holding power and longevity has presented much difficulty.

The present invention is particularly directed to a firm and long-life key and groove securement for interlocking the individual laminations of a laminated structure.

In accordance with the present invention as applied to the annular stator of dynamoelectric machines, a plurality of circumferentially distributed key slots are formed in the outer diameter of the stack of individual sheet-like laminations. The slots are each similarly formed with a narrow or restricted opening intermediate the depth of the slot. A rod-like key somewhat larger than the width of the restricted opening is forced and wedged in the restricted opening with the force preferably applied radially of the core of the stator to securely lock the laminating together. The key in the wedged position is spaced from the base of the groove. Applicant has found that this spacing of the key is critical to the maintenance of a tight wedging fit for very long periods during subsequent operation of the core structure.

The movement of the rod-like key into the restricted opening of the present invention also moves any misaligned laminations into precise alignment with the adjacent laminations.

The drawing furnished herewith illustrates the best mode presently contemplated for carrying out the invention.

In the drawing:

FIG. 1 is an end elevational view of a stator constructed in accordance with the present invention;

FIG. 2 is a side elevational view of FIG. 1;

FIG. 3 is an enlarged fragmentary end view more clearly showing the grooved construction of the present invention; and FIG. 4 is a fragmentary view showing an alternative form.

Referring to the drawing, a stator core 1 typical of a dynamoelectric machine is illustrated including a plurality of individual annular laminations 2 which are secured superposed in face-to-face relation in the well known manner to define a cylindrical bore 3 having suitable winding slots 4 for operating windings, not shown. Although not separately shown, each of the individual laminations 2 is normally provided with a thin oxide or varnish coating constituting a minute insulating barrier between the individual laminations. Four equicircumferentially distributed axial key grooves or slots 5 are formed in the outer circumference of the stator core 1 extending axially with respect to the core and across the complete outer edge portion of the stacked laminations. A solid cylindrical rod-like key 6 is wedged tightly within the slots 3 to interlock the laminations 2. The outer ends of each key 6 are extended axially beyond the end faces of core 1 and are bent over as at 7 to hold the end laminations 2 in place. The wedge fit of the keys 6 in the slots 3 and the bent over ends 7 serve as the sole means to securely lock the laminations 2 together.

Generally, the laminations 2 are individually stamped with the bore 3, winding slots 4 and key slots 5 and then stacked with slots 4 and 5 properly aligned. A non-symmetrical stacking notch 8 is provided in the edge of the laminations 2 for stacking of the laminations 2 with the slots 5 aligned.

Referring particularly to FIGS. 1 and 3, each of the individual slots 3 includes a semi-circular base portion or wall 9 with the center thereof slightly inwardly of the depth of the slot 3. Inwardly projecting side walls 10 are generally arcuately shaped and extend outwardly from the ends of the semi-circular base wall 9. The side walls 10 define a restricted opening located inwardly of the outer circumference of the stator core 1 and somewhat smaller than the diameter of the solid cylindrical rod-like key 6. The keys 6 are tightly wedged within the restricted openings defined by the side walls 10 with the keys spaced from the bottom of the corresponding base portions 9.

In carrying out the present invention, the individual laminations 2 are stamped and disposed in a suitable stacking machine. The rod-like keys 6 are then forced into the respective slots 3 with the inserting force exerted generally on a radial line toward the bore of the stator core 1.

In moving into the slots 3, the keys 6 engage the side walls 10 and rotate any misaligned lamination 2 into accurate alignment with the balance of the laminations.

As previously described, the diameter of the cylindrical key 6 is somewhat larger than the width of the restricted openings between the side walls 10. The keys 6 are forced into the restricted openings and tightly wedged and swaged within the slots 5 to securely interconnect the laminations. After the keys 6 are wedged in place, the axially projecting ends are bent over as at 7 to complete the securement of the laminations 2 together.

In FIG. 3, the key 6 is deformed or upset by the side walls 10 to form a strong and tight interlocking of the laminations 2. The cutting of each lamination 2 into key 6 eliminates uneven stacks normally caused by variation in thickness of lamination material. However, the lamination 2 may be upset within the scope of the invention such as shown in FIG. 4 wherein the key 6 remains generally true with the laminations 2 cutting into the key 6 to form the firm interlocking of the laminations together.

The spacing of keys 6 has been found essential for maintaining the keys 6 tightly wedged in place for maximum periods during subsequent operation of the dynamoelectric machine employing the stator core 1.

The present invention thus provides a long-life key and slot securement means for tightly interlocking the individual lamination of a laminated structure in a practical construction.

Various modes of carrying out the invention are contemplated as being within the scope of the following claim particularly pointing out and distinctly claiming the subject matter which is regarded as the invention.

I claim:

In a laminated structure, a stack of individual sheet-like laminations consisting of a deformable material superposed in face-to-face relation, said stack having a longitudinal slot extending coextensively along an edge, said slot including deformable side walls defining a restricted opening generally centrally of the slot with laterally enlarged portions to the radially opposite sides of the restricted opening, and a solid cylindrical key having a nominal diameter somewhat larger than the width of the restricted opening, said key being disposed in the longitudinal slot whereby the side walls are deformed and said key is permanently wedged within the restricted opening completely within the slot, said key serving to permanently and evenly spaced and firmly interlock the laminations to each other thereby insuring alignment of the laminations.

References Cited by the Examiner

UNITED STATES PATENTS

| | | | |
|---|---|---|---|
| 1,654,306 | 12/1927 | Paszkowski | 29—155.61 |
| 2,506,637 | 5/1950 | Fog | 310—217 |
| 2,610,225 | 9/1952 | Korski | 310—217 |
| 3,012,162 | 12/1961 | Rediger | 310—217 |

FOREIGN PATENTS

| | | |
|---|---|---|
| 739,992 | 6/1954 | Great Britain. |

ORIS L. RADER, *Primary Examiner.*

MILTON O. HIRSHFIELD, DAVID X. SLINEY, *Examiners.*

D. F. DUGGAN, P. L. McBRIDE, *Assistant Examiners.*